United States Patent [19]
Gutkin

[11] Patent Number: 5,976,730
[45] Date of Patent: Nov. 2, 1999

[54] ELECTRICAL ENERGY GENERATION

[75] Inventor: Timofei Gutkin, Brooklyn, N.Y.

[73] Assignee: White Eagle International Technologies, Inc., New York, N.Y.

[21] Appl. No.: 08/645,432

[22] Filed: May 13, 1996

Related U.S. Application Data

[63] Continuation of application No. 08/246,079, May 19, 1994, abandoned.

[51] Int. Cl.$^6$ .............................. H01M 4/76; H01M 6/04
[52] U.S. Cl. .......................................... 429/204; 429/234
[58] Field of Search ...................................... 429/204, 234

[56] References Cited

U.S. PATENT DOCUMENTS

| | | | |
|---|---|---|---|
| 387,643 | 8/1888 | Hewett | 429/204 X |
| 517,455 | 4/1894 | Henry | 429/204 |
| 763,425 | 6/1904 | Lord | 429/204 |
| 2,619,437 | 11/1952 | Glasstone | 429/204 |
| 4,929,518 | 5/1990 | Yoshinaka et al. | 429/204 X |

*Primary Examiner*—John S. Maples
*Attorney, Agent, or Firm*—Ilya Zborovsky

[57] ABSTRACT

An electrical battery has a negative electrode, a positive electrode, an electrolyte including a sulfuric acid solution, a positive active mass, and a cuvette disposed horizontally and composed of a material which does not interact with the sulfuric acid solution, the positive active mass being placed in the horizontally disposed cuvette.

10 Claims, 3 Drawing Sheets

ELECTRICAL ENERGY GENERATION

CROSS REFERENCE TO RELATED APPLICATION

This application is a continuation of patent application Ser. No. 08/246,079 filed on May 19, 1994, now abandoned.

BACKGROUND OF THE INVENTION

The present invention is related to electrical energy generation and can be used in power plants in which it is necessary to use transportable or non-transportable sources of electrical energy with high capacity, long service life and short charging time.

It is known to use electrical batteries to accumulate electrical energy. The widely used battery is a lead battery, which usually includes two lattice lead plates filled with a paste of lead oxide mixed with water. The plates are inserted in a vertical position into a water solution of sulfuric acid with density 1.15–1.20 g/cm$^3$ (22–28%). As a result of the reaction $$PbO+H_2SO_4=PbSO_4+H_2O$$

lead oxide, after a certain time, is transformed into lead sulphate. When electric current passes through the battery from external current source during charging, negative ions $SO_4^{--}$ move to the anode and transform the lead sulphate into lead peroxide according to the formula:

$$PbSO_4+SO_4+2H_2O=PbO_2+2H_2SO_4.$$

Positive hydrogen ions move to the cathode and reduce the sulphate into metallic lead according to the formula $$PbSO_4+H_2=Pb+H_2SO_4.$$

As a result, after passage of the electric current, the two plates become sharply asymmetric, since one of them becomes a lead plate and the other becomes a lead peroxide plate. The battery is charged. It is a galvanic pair, which is capable of being an electric current source. Electromotive force of this battery at full charging is raised to 2 volts. When the battery supplies the electric current to an external circuit, it discharges and all processes proceed in an opposite direction. At the end of discharging both plates are covered with identical layers of lead sulphate and electromotive force falls down to zero. However, in practice, at the end of discharging the electromotive force does not reduce below 1.85 volts, because the battery is destroyed with more discharging.

Capacity of the battery is determined by a quantity of positive and negative active mass and the number of pores they contain, as well as by quantity and concentration of a solution of sulfuric acid in electrolyte and the design of the battery. The drawbacks of known batteries include a small battery service life, small capacity, a long charging time, small weight of the positive active mass, as compared with the lattice lead plates where the active mass is located, and small coefficient of utilization of the positive active mass.

The battery service life depends on the service life of the positive plates due to corrosion of metallic lattices and decrease of the positive active mass. The lattice plates of the positive electrode have direct contact with the electrolyte-water solution of sulfuric acid when the electric current passes through the electrolyte of the battery during charging, and the negative ions $SO_4^{--}$ and $O^{--}$ move to the metallic lattice. The negative ions $SO_4^{--}$ and $O^{--}$ have open bonds, and therefore active interaction with the material of the lattice takes place and the material is destroyed. The second factor which substantially limits the service life of the known battery is a fall of the positive active mass $PbO_2$. As a result, the positive plates and accordingly the positive active mass in the known batteries are relatively thin, which substantially limits the battery capacity. Because of the fall of the positive active mass, the weight of the lattice lead plate is too big when compared with the positive active mass. Thin lattice lead plates can support only small positive active mass. The coefficient of utilization of the positive active mass is low. It can be increased by providing the positive active mass with a great number of pores. However, the fall of the positive active mass is so extensive that the battery becomes disabled in a very short time. Even with a very small quantity of pores (dilator), this negative effect takes place.

The fall of the positive active mass becomes stronger with increase of concentration of sulfuric acid in the electrolyte. In order to counteract this fall of the positive active mass, the battery is provided with special separators pressed to the positive plates. However, it prevents expansion of the positive active mass. Also, the inner resistance of the battery is increased. The separators also make difficult access of sulfuric acid to the plates with the active mass, and the quantity of sulfuric acid in the battery is diminished. The voltage drops substantially inside the battery when the electric current is high. In the presence of the separators, the substantial part of potential drop is lost uselessly. The consumption of sulfuric acid per unit time is high when the electric current discharging the battery is high and the pores of the separators do not allow passage of required quantities of sulfuric acid. Thus, the fall of positive active mass is a second factor which strongly limits the service life and the capacity of the lead battery.

SUMMARY OF THE INVENTION

Accordingly, it is an object of the present invention to provide a method of accumulation of electrical energy and an electrical battery with a substantially longer service life and higher capacity and substantially shorter charging time.

In keeping with these objects, in the present invention an electric battery has a positive electrode, a collector and an electrolyte solution of sulfuric acid, in which a positive active mass is accommodated in a cuvette disposed horizontally and composed of a material which does not interact with the solution of sulfuric acid.

The cuvette can be composed of organic material which does not interact with the sulfuric acid solution. The collector can be placed on the bottom of the cuvette for electrical contact with the positive active mass $PbO_2$. The collector has a terminal for outside electrical contact during charging and discharging of the battery. The collector is formed as a plate adjoining the surface of the cuvette. The cuvette is filled with the positive active mass over the collector. Therefore, the collector is isolated from direct contact with the solution of sulfuric acid-electrolyte from all sides, with the exception of the portion in contact with the positive active mass. This substantially prevents dissolving of the collector and therefore provides a long working time of the battery.

The terminal from the collector is covered with an organic protective layer (pellicle) to protect it from direct contact with the sulfuric acid solution. Since the collector is protected from direct contact with the electrolyte, it is possible to use not only lead, but also other metals, to make the electrode, for example of aluminum. Usually, the sulfuric acid solution dissolves aluminum, especially due to the heating. The contact of lead and aluminum with the positive active mass $PbO_2$ promotes creation of an oxide pellicle on the surface of metal and, therefore, interaction of lead and aluminum with the sulfuric acid solution slows down. If the collector is made of aluminum and is twice thicker than the lead electrode, the weight of the aluminum electrode is only half and, therefore, the battery weight is substantially reduced. Thus, the isolation of the collector from direct contact with the electrolyte contributes to considerable increase in the service life of the collector and the battery as a whole.

The positive active mass placed in the cuvette, which is disposed horizontally, eliminates the fall of the positive active mass. Therefore, a sufficiently thick layer (80 mm and more) can be used as a positive active mass. This increases the capacity of the battery and reduces the weight of the collector relative to the active mass. As a result, the capacity of the battery per unit weight is much greater than in the known batteries.

Since the positive active mass cannot fall, it is not necessary to use the separators, therefore, the inner resistance is reduced and power losses, especially with large electric currents of charging and discharging of the battery are excluded. This in turn excludes heating of the battery content, including electrolyte. Low temperature of the electrolyte considerably reduces the activity of interaction of the sulfuric acid solution with the metal electrode and, therefore, substantially increases the working time of the battery. The proposed solution eliminates corrosion of the electrode plates and fall of the positive active mass, the two factors which lead to substantial increase of the working time and capacity of the battery.

The positive active mass is placed in the cuvette which is disposed horizontally and this completely eliminates the fall of the positive active mass. Therefore, admixtures can be added in the positive active mass, such as dilators, to provide a plurality of pores in it and, therefore, to increase the coefficient of utilization of the positive active mass. The considerable surface increase in the positive active mass as a result of the pores increases the working period of the battery during discharging. In view of the decreased density of electric current, high electric currents can be used during discharging. The covering surface of the positive active mass with lead sulphate is increased so that the positive active mass can be isolated from contact with the electrolyte.

The considerable increase of contact of the positive active mass with the electrolyte takes place as a result of the use of loosening of the mass in the form of cylindrical wads composed of glass wool with high degree of porosity (85–90%). The wads are disposed in staggered order on the surface of the cuvette and through the whole depth of the positive active mass. Therefore, a layer of the positive active mass with the thickness of 80 mm and more can be utilized and a large surface of interaction of the positive active mass with the electrolyte is provided. This, in turn, allows carrying out the considerable capacity of the battery. Thus, the use of the admixtures-dilators and the loosening considerably increases the surface of the positive active mass interacting with the electrolyte. Due to the high degree of porosity of the glass wool, the electrolyte easily penetrates through the thickness of the positive active mass and through its pores in the whole volume of the positive active mass. The time of discharging is increased and there is no total covering of the positive active mass by lead sulphate.

The negative electrode is composed of pure lead with a thickness of 12–25 mm with a great number of slots to increase the surface contact with the electrolyte 8–10 times. The considerable thickness of the plate provides a long working time of the battery (25–30 years). A subsequent increase of the negative electrode surface can be provided by electrochemical molding so that it has a spongy structure, which also fills the slots. The negative electrode is placed in the cuvette composed of an organic material, which does not interact with the sulfuric acid solution. Therefore, the lead plate of the negative electrode is isolated from direct contact with the sulfuric acid solution, with the exception of its portion which faces the positive active mass. The negative electrode does not limit the working time of the battery. During charging, the hydrogen ions move toward the negative electrode and do not react with lead, while during discharging lead sulphate accumulates on its surface. The negative electrode is located above the positive active mass and can lean against lugs of the vessel with electrolyte. The negative electrode leans upon the lugs of the vessel with electrolyte.

Elements of the negative electrode can fall from above in the positive active mass. However, it does not have any influence on the operation of the battery. During charging and discharging they turn into the positive active mass as a result of the elctrochemical action.

The novel features of the present invention are set forth in particular in the appended claims, the invention itself will be best understood from the consideration of the following description of the preferred embodiments, which is accompanied by the drawings.

DESCRIPTION OF THE PREFERRED EMBODIMENTS

Figure 1:
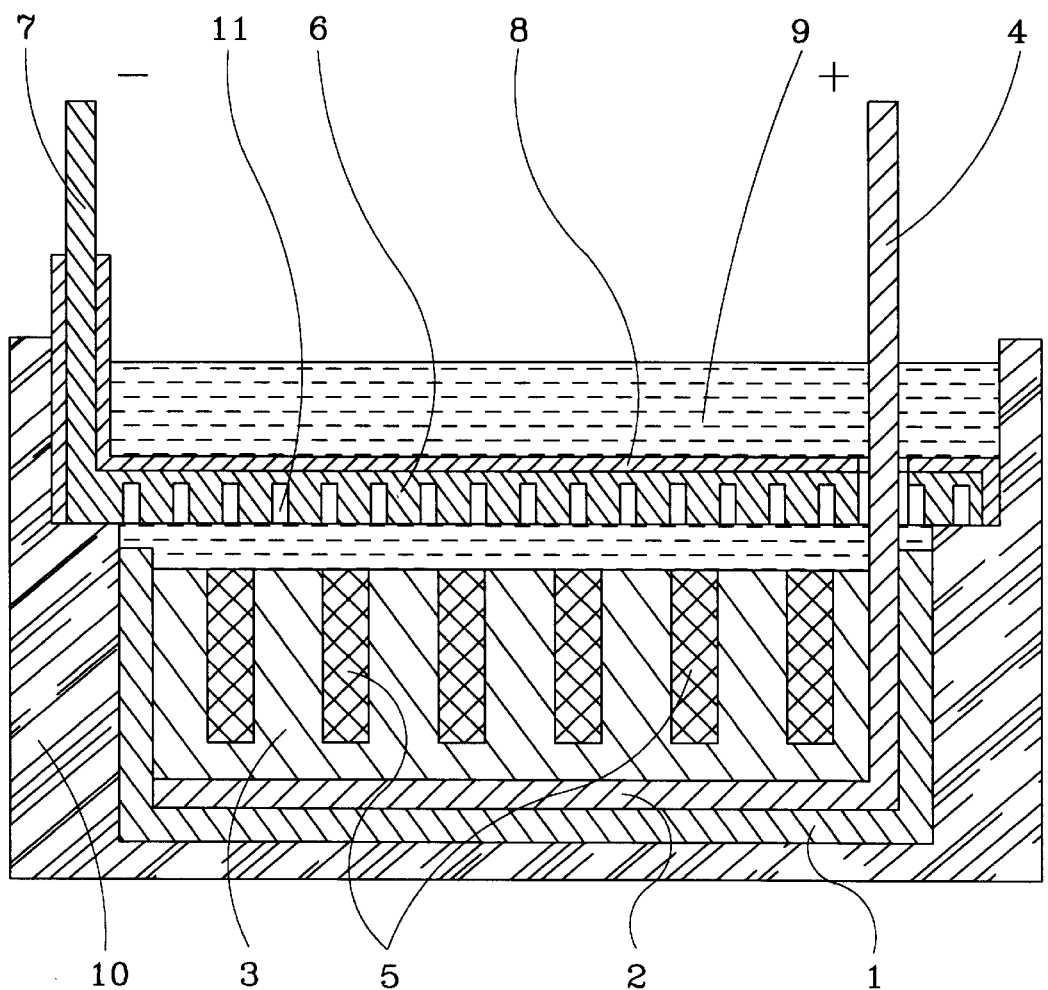
FIG. 1 is a view showing the section of the electrical battery in accordance with the present invention.

As shown in FIG. 1, an electrical battery in accordance with the present invention has a cuvette 1 disposed horizontally. The cuvette is composed of an organic material which does not react with the sulfuric acid solution. The positive active mass 3 ($PbO_2$) is placed in the cuvette above a collector 2 for electrical contact with it. The collector is arranged on the bottom of the cuvette and has a terminal 4 for an outside electrical contact for charging and discharging the battery. The terminal is covered with an organic protective layer (pellicle) to protect it from direct contact with the sulfuric acid solution.

The surface of the collector 2 is isolated from direct contact with the sulfuric acid solution-electrolyte from all sides, with the exception of a portion which is in contact with the positive active mass. As a result, the whole surface of the collector 2 which is a part of the positive electrode does not have direct contact with electrolyte and does not react with the sulfuric acid solution, which ensures a long working time.

Figure 2:
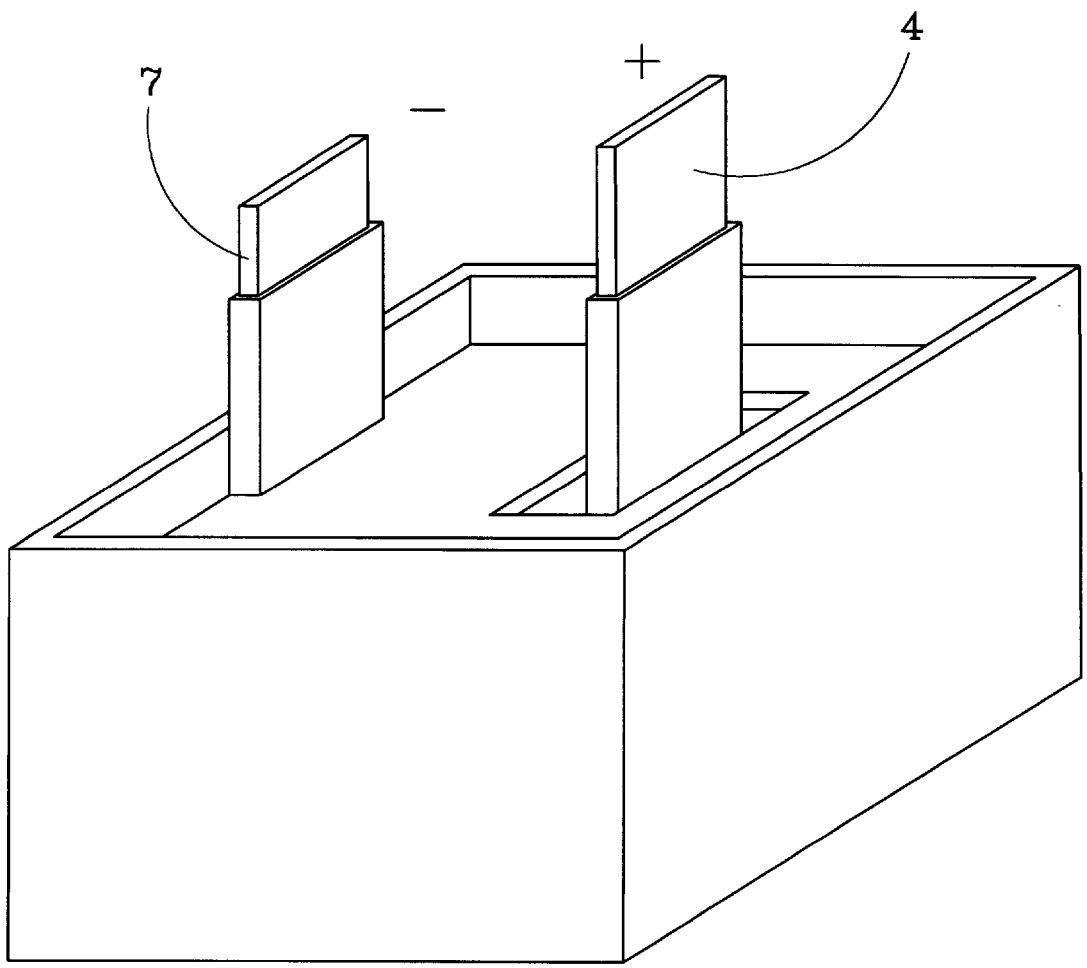
FIG. 2 is a side view of a collector of the inventive electrical battery.

Cylindrical loosening wads 5 are located in the positive active mass and are composed of glass wool with a high porosity (85–90%). As shown in FIG. 2, the loosening wads are arranged in staggered order on the surface of the cuvette and approximately through the whole depth of the positive active mass. The loosening wads allow the electrolyte to penetrate easily through the whole thickness of the positive active mass. The cuvette, the collector and the positive active mass on it are placed on the bottom of a vessel 10, which is filled with a sulfuric acid solution-electrolyte with a density of 22–41%.

The cuvette 8 is provided with a lead negative electrode 6 having a terminal 7 for an outside electrical contact for charging and discharging of the battery. The cuvette 8 with the negative electrode 6 is disposed horizontally above the cuvette 1 with the positive active mass 3 and does not have direct contact with the positive active mass. The negative electrode 6, with the cuvette 8 fitting closely to its surface, leans upon a ledge of the vessel 10. The close proximity of the cuvette 8 to the surface of the negative electrode prevents direct contact of the metallic negative electrode with the sulfuric acid solution, with the exception of a portion which faces the positive active mass. The electrode 6 rests on shoulders of vessel 10.

Figure 3:
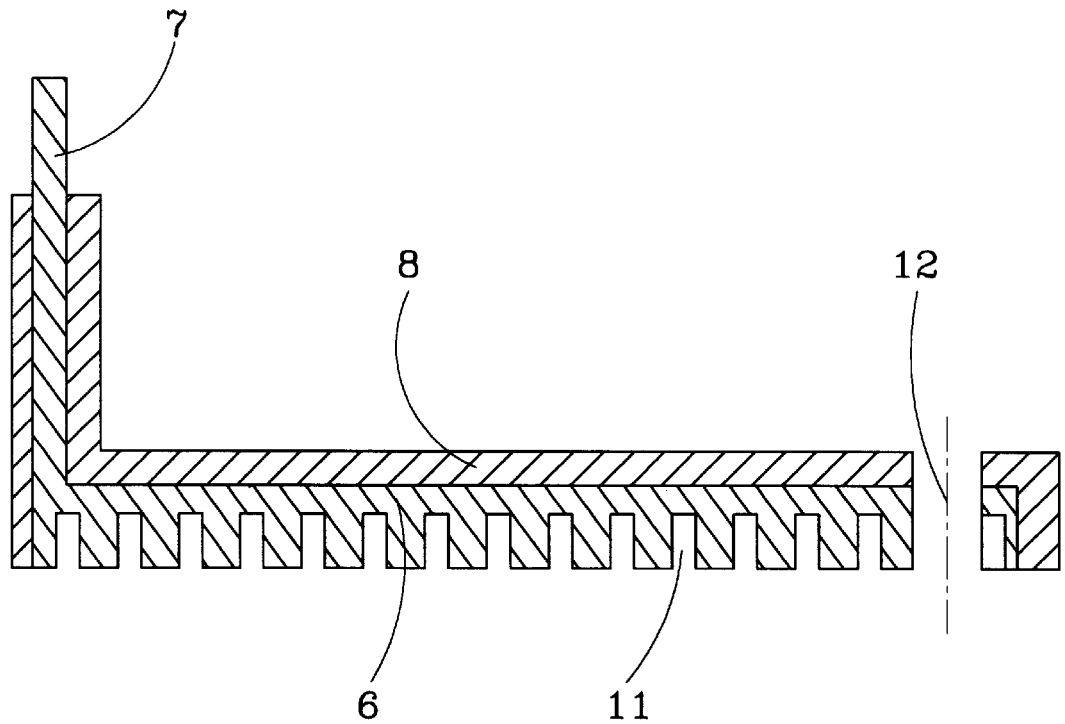
FIG. 3 is a view showing a section of the negative electrode of the inventive electrical battery.
Figure 4:
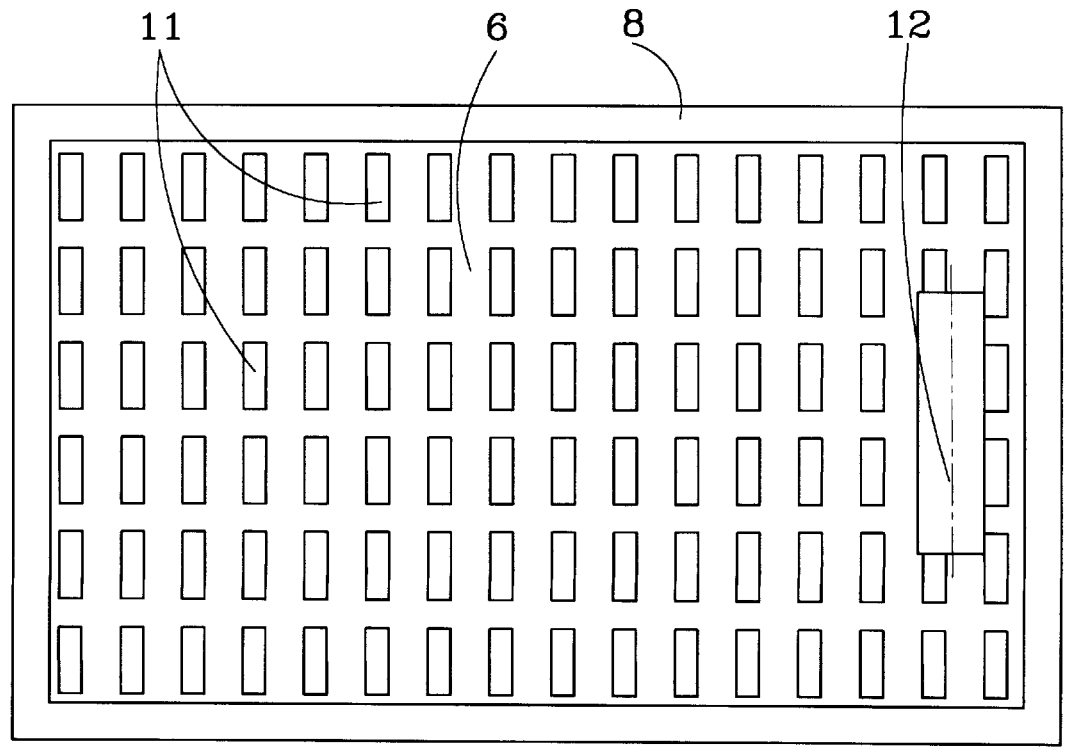
FIG. 4 is a view of the negative electrode from below.

As shown in FIG. 3, the negative lead electrode 6 is provided with a plurality of chinks 11, extending through a partial thickness of the electrode from the side facing the positive active mass, so that the sulfuric acid solution does not reach the non-working part of the negative electrode. The chinks 11 increase the active surface of the lead electrode 8–10 times. The negative lead electrode is shown in FIG. 4 from below. It can be seen that the chinks 11 are arranged on the whole surface of the negative electrode facing the positive active mass. The negative electrode is placed in the vessel 10 filled with the sulfuric acid solution-electrolyte. The electrolyte with a concentration of 22–41% $H_2SO_4$ has in the vessel 10 such a level that it completely covers the positive cuvette, as well as the negative cuvette. The negative electrode is greater than the positive electrode by the size corresponding to the lugs for leaning of the negative electrode.

The battery described herein above operates in the following manner: The positive cuvette is filled with a paste composed of lead oxide mixed with water. The negative cuvette contains the lead plate with the chinks. The electrolyte is supplied into the positive cuvette. As a result of reaction $$PbO+H_2SO_4=PbSO_4+H_2O$$

lead oxide is transformed into the lead sulphate. In the negative cuvette lead does not react with the sulfuric acid solution.

When electric current passes through the battery from an external current force during charging, the negative ions SO4−− and O−− move to the positive cuvette and transform lead sulphate into lead peroxide in accordance with the formula $$PbSO_4+SO_4^{--}+H_2O=PbO_2+2H_2SO_4.$$

The positive hydrogen ions move to the negative cuvette and do not react with the metallic lead. As a result of passage of the electric current from the external current source, the positive cuvette is filled with the positive active mass-lead peroxide and the negative cuvette contains the lead. The battery is charged. A galvanic pair can be an electric current source. Electromotive force of the battery is raised to 2.1 volts. When the battery supplies electric current back into an external circuit, the battery is discharged.

During discharging of the battery, lead in the negative cuvette has electrons tied together with ions of $SO_4^{--}$ and is transformed into the lead sulphate which is dissolved in the electrolyte. In the positive cuvette, in the positive active mass $Pb^{4+}$, in solid state form $Pb^{2+}$ passes into the solution and transforms into lead sulphite, so as to fall on the surface of the positive active mass in accordance with the following formulae:

$$PbO_2+4H^++2e\rightarrow Pb^{2+}+2H_2O$$

$$Pb^{2+}+SO_4^{--}\rightarrow PbSO_4$$

The battery has the following features:

In the positive cuvette the collector is used for electrical contact with the positive active mass. The collector has a terminal for the outside electrical contact during charging and discharging. The collector is placed on the bottom of the cuvette disposed horizontally. The cuvette is composed of an organic material and does not interact with the sulfuric acid solution. The collector is a plate which directly adjoins the surface of the cuvette. The cuvette is filled with the positive active mass over the collector plate. Depending on requirements to the capacity of the battery, the volume of the cuvette can be chosen differently. The thickness of the positive active mass can be from 2 mm to 80 mm and more. The height of the cuvette is somewhat greater. The collector plate is isolated from direct contact with the sulfuric acid solution. As a result, when the electric current passes through the electrolyte of the battery during charging, the negative ions $SO_4^{--}$ and $O^{--}$ with their open bonds and ability to actively interact with the metallic material move toward the positive active mass, they do not reach the metal surface and, as a result, do not destroy the collector plate. This substantially eliminates the solution of the collector plate by sulfuric acid and contributes to the long working time of the battery.

The isolation of the collector from direct contact with the electrolyte allows use of not only lead, but also other metals such as, for example, aluminum, for electrical contact with the positive active mass. Usually the sulfuric acid solution dissolves aluminum, especially by heating. However, cool nitric acid does not dissolve aluminum and makes it passive, so that it can no longer be dissolved in sulfuric acid solution. Therefore, after treating aluminum in cool nitric acid from one side and protecting it from direct contact with sulfuric acid solution from another side, aluminum can also be used instead of lead.

Both the lead and aluminum in contact with the positive active mass of lead peroxide promotes formation of oxidized pellicle on the surface of metal. Therefore, the process of interaction of lead and/or aluminum with sulfuric acid solution is considerably slowed down. The metal electrodes from aluminum can be twice thicker than the plate from lead and the electrode from aluminum has half the weight of the lead electrode, so that the battery rate is substantially smaller.

The positive active mass is placed in the cuvette, which is disposed horizontally. Therefore, the fall of the positive active mass is completely eliminated and the working life of the battery becomes practically unlimited. The positive active mass disposed horizontally to eliminate its fall, and it is possible to use the positive active mass having a great thickness, such as 80 mm and more and at the same time having a very large area. As a result, the positive active mass has a large volume to provide a great capacity of the battery. The weight of the is small when compared with the positive active mass and, therefore, the capacity of the battery per unit weight is very high. Also, the positioning of the active mass in the horizontal cuvette makes possible to add admixtures to increase porosity of the active mass, such as, for example, dilators. This increases the coefficient of utilization of the positive active mass. The considerable increase of the surface as result of a substantial quantity of pores in the positive active mass increases the working time of the battery during discharging. Therefore, the density of electric current during discharging is reduced and, accordingly, covering of the surface of the positive active mass by lead sulphate is reduced, so that the positive active mass is isolated from contact with the electrolyte.

The considerable increase of contact of the positive active mass with the electrolyte results from the use of the loosening wads, composed of glass wool with high porosity (85–90%). Due to the great porosity of the glass wool, the electrolyte easily penetrates through the whole thickness of the positive active mass and through the pores, so as to penetrate through the whole volume of the positive active mass. The horizontal location of the positive active mass allows the use of high electric currents for charging of the battery, which currents provide formation of a friable structure of the positive active mass. Therefore, on the one hand, charging of the battery can be provided over a very short time, for example 15–30 minutes, with high electric current and, on the other hand, favorable conditions are created for positive active mass to contact the electrolyte over the whole volume. This contributes to a long discharging time of the battery and results in considerable covering of the surface with $PbSO_4$.

In the negative cuvette, the negative electrode composed of pure lead has a plate thickness depending on the necessary capacity of the battery, such as for example, from 2 mm to 25 mm. It has a plurality of slots, so that the contact surface with the electrolyte is increased 8–10 times. The surface of the lead is increased during multiple charging and discharging. After complete electrochemical molding of the lead plate, it obtains a spongy structure with preliminarily formed chinks, and the electrode is therefore has a spongy electric mass with a great surface contact with the electrolyte. It has been found that the lead surface can be equal to 1000 $cm^2$ per 1 gm of lead. The elements of the negative electrode can fall into the positive active mass, which however does not influence the operation of the battery. During charging and discharging, as a result of electrochemical action, they turn into the positive active mass. The volume of the positive active mass, as well as of the negative electrode, is determined by conditions of use of the battery. In the battery which is used in cars, in particular in starters and similar equipment, it is not necessary to have a large volume of the active mass. The electrical energy stored in the battery is used for a short time during starting of the motor, and then, during the operation of the engine the energy is completely restored. The thickness of the active mass in this case can be 2–3 mm.

The battery with the active mass having a great volume (such as, for example, thickness of the positive active mass 80 mm and more), with a large area and correspondingly with a great capacity can be used as a basic source of electrical energy for submarines, tanks, electrical cars, electrical locomotive, for telephone stations, telegraph and radio stations, for controlling fluctuating loading of electrical power stations.

The present invention is not limited to the details shown, since various modifications and structural changes are possible without departing in any way from the spirit of the present invention.

What is desired to be protected by Letters Patent is set forth in the appended claims.

It is claimed:

1. Electrical battery, comprising a positive electrode having a positive active mass; and electrolyte including a sulfuric acid solution; a horizontal negative electrode located above said positive active mass and separated by said electrolyte from said positive active mass; and a cuvette, said positive active mass being placed in said cuvette as a horizontally extending element; and a vessel forming a housing of the battery.

2. An electrical battery as defined in claim 1, wherein said cuvette has a bottom, and a collector adjoins said bottom of said cuvette and is in electrical contact with said positive active mass.

3. An electrical battery as defined in claim 2, wherein said collector has a terminal for an outside electrical contact.

4. An electrical battery as defined in claim 2, wherein said collector is composed of a material selected from the group consisting of lead and aluminum.

5. An electrical battery as defined in claim 1, wherein said positive active mass is porous.

6. An electrical battery as defined in claim 1; further comprising a plurality of loosening elements, provided in said positive active mass.

7. An electrical battery as defined in claim 6, wherein said loosening elements are formed as wads composed of glass wool with high porosity and arranged in staggered order over a surface of said cuvette over approximately a whole depth of said positive active mass.

8. An electrical battery as defined in claim 1; further comprising an additional cuvette accommodating said negative electrode and located above said first mentioned cuvette.

9. An electrical battery as defined in claim 1, wherein said negative electrode has a side facing said positive active mass and provided with a plurality of chinks.

10. An electrical battery as defined in claim 2, wherein said collector has a terminal for an outside electrical contact.

\* \* \* \* \*